United States Patent
Chen et al.

(10) Patent No.: US 10,860,164 B2
(45) Date of Patent: Dec. 8, 2020

(54) INFORMATION INPUT METHOD AND APPARATUS

(71) Applicant: ADVANCED NEW TECHNOLOGIES CO., LTD., Grand Cayman (KY)

(72) Inventors: Wenhong Chen, Hangzhou (CN); Weigang Guan, Hangzhou (CN); Chenchen Lv, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/281,331

(22) Filed: Feb. 21, 2019

(65) Prior Publication Data

US 2019/0187860 A1    Jun. 20, 2019

Related U.S. Application Data

(63) Continuation of application No. PCT/CN2017/096991, filed on Aug. 11, 2017.

(30) Foreign Application Priority Data

Aug. 23, 2016   (CN) .......................... 2016 1 0710394

(51) Int. Cl.
*G06F 3/048*   (2013.01)
*G06F 3/0481*  (2013.01)
(Continued)

(52) U.S. Cl.
CPC .......... *G06F 3/0481* (2013.01); *G06F 3/0483* (2013.01); *G06F 16/957* (2019.01);
(Continued)

(58) Field of Classification Search
CPC ...... G06F 3/048; G06F 16/957; G06F 3/0483; G06F 21/602; G06F 3/0481; F06F 3/0481; H04L 63/083
See application file for complete search history.

(56) References Cited

U.S. PATENT DOCUMENTS 7,793,232 B2    9/2010   Chaudhri et al.
8,365,203 B2    1/2013   Wong et al.
(Continued)

FOREIGN PATENT DOCUMENTS

CN    103383629 A  *  11/2013
CN    103383629 A     11/2013
(Continued)

OTHER PUBLICATIONS

International Preliminary Report on Patentability for Application No. PCT/CN2017/096991 dated Feb. 26, 2019, 9 pages.
(Continued)

*Primary Examiner* — Xuyang Xia

(57) ABSTRACT

An information input method and apparatus is provided. The method comprises: obtaining attribute information of a page input box, wherein the page input box is located at a front-end page of a mobile end application; according to the attribute information, creating a native input box having the attribute information, wherein the native input box is created at a native layer; and filling information, input by a user through the native input box, back to the page input box, thus finally ensuring that the information is input rapidly and effectively.

14 Claims, 4 Drawing Sheets

(51) Int. Cl.
    *G06F 3/0483* (2013.01)
    *G06F 16/957* (2019.01)
    *G06F 3/0484* (2013.01)
    *G06F 21/60* (2013.01)
    *H04L 29/06* (2006.01)

(52) U.S. Cl.
    CPC ........ *G06F 3/04842* (2013.01); *G06F 21/602* (2013.01); *H04L 63/083* (2013.01)

(56) References Cited

U.S. PATENT DOCUMENTS

| | | | |
|---|---|---|---|
| 9,293,008 | B2 | 3/2016 | Barclay et al. |
| 9,448,776 | B1 | 9/2016 | Sankaran et al. |
| 9,454,303 | B2 | 9/2016 | Andres et al. |
| 2002/0112078 | A1 | 8/2002 | Yach |
| 2006/0200749 | A1 | 9/2006 | Shenfield |
| 2011/0033040 | A1* | 2/2011 | Nakashima ........... G06F 3/1454 380/28 |
| 2012/0159310 | A1 | 6/2012 | Chang et al. |
| 2014/0298161 | A1* | 10/2014 | Shu ................... G06F 17/2247 715/234 |
| 2014/0337788 | A1 | 11/2014 | Hu et al. |
| 2014/0380228 | A1* | 12/2014 | Shu ...................... G06F 3/0484 715/780 |
| 2015/0007018 | A1 | 1/2015 | Shu et al. |
| 2015/0281869 | A1 | 10/2015 | Ramachandran et al. |
| 2017/0235378 | A1 | 8/2017 | Mou |

FOREIGN PATENT DOCUMENTS

| | | | | |
|---|---|---|---|---|
| CN | 103902057 | A | | 7/2014 |
| CN | 104077313 | A | | 10/2014 |
| CN | 104102418 | A | | 10/2014 |
| CN | 104142911 | A | | 11/2014 |
| CN | 103051516 | B | | 4/2016 |
| CN | 105630187 | A | * | 6/2016 ............ G06F 3/023 |
| CN | 105630187 | A | | 6/2016 |
| CN | 105786338 | A | | 7/2016 |
| CN | 105808222 | A | | 7/2016 |
| CN | 106101849 | A | | 11/2016 |
| CN | 106406687 | A | | 2/2017 |
| CN | 106873862 | A | | 6/2017 |
| EP | 2518616 | A1 | | 10/2012 |
| EP | 2806380 | A1 | | 11/2014 |
| JP | 1999-149452 | A | | 6/1999 |
| JP | 2001-285286 | A | | 10/2001 |
| KR | 10-2011-0000314 | A | | 1/2011 |
| WO | 2014078341 | A2 | | 5/2014 |
| WO | 2016/070753 | A1 | | 5/2016 |

OTHER PUBLICATIONS

International Search Report and the Written Opinion dated Nov. 13, 2017, issued in related International Application No. PCT/CN2017/096991 (10 pages).
First Search for Chinese Application No. 201610710394.9 dated Aug. 15, 2019 (1 page).
First Office Action for Chinese Application No. 201610710394.9 dated Aug. 27, 2019 (6 pages).
Supplementary Search for Chinese Application No. 201610710394.9 dated Jan. 28, 2020 (1 page).
Search Report for European Application No. 17842813.2 dated Feb. 28, 2020.
Office Action for Japanese Application No. 2019-510941 dated Jun. 23, 2020.
Office Action for Korean Application No. 10-2019-7008134 dated Sep. 24, 2020.

* cited by examiner

INFORMATION INPUT METHOD AND APPARATUS

CROSS-REFERENCE TO RELATED APPLICATIONS

The present application is a continuation application of International Application No. PCT/CN2017/096991, filed on Aug. 11, 2017, which is based on and claims priority to and benefits of the Chinese Patent Application No. 201610710394.9 filed with the State Intellectual Property Office (SIPO) of the People's Republic China on Aug. 23, 2016. The entire contents of the above-identified applications are incorporated herein by reference.

TECHNICAL FIELD

The present specification relates to computer technology, particularly to an information input method and apparatus.

BACKGROUND

Mobile terminal APP often sets some input boxes at application pages, such as an input box instructing the user to input a password, or an input box for input of a transfer amount. When information is input into an input box, an input keyboard self-defined by the APP may be adopted. For example, the APP may monitor the focus event of an input box and displays this input keyboard when the event occurs, so that the user can input information by clicking this keyboard. The APP may synchronize information to an input box. This method for inputting information to an input box is prone to focus confusion when the application page is complex. For example, when information is input to an input box at a web page, if the input box is clicked with a mouse, a flashing cursor will appear in the input box. It is equivalent to a focus. When a cursor flashes, it means information may be input to the input box. However, sometimes the focus may disappear suddenly when information is input to the input box, resulting in failure of input to the input box, i.e., no information is input to the input box and the input operation needs to be repeated several times. For example, the input box may be clicked once again to make the appearance of the focus until the input is completed.

SUMMARY

For this purpose, the present specification provides an information input method and apparatus to ensure that the information is input effectively.

Specifically, the present specification is achieved through the following technical solutions:

In the first aspect, the specification provides an information input method, which comprises:

obtaining attribute information of a page input box, wherein the page input box is located at a front-end page of a mobile application;

according to the attribute information, creating a native input box having the attribute information, wherein the native input box is created at a native layer; and filling information, input by a user through the native input box, back to the page input box.

In the second aspect, the specification provides an information input apparatus, which comprises:

an attribute obtaining module for obtaining attribute information of a page input box, wherein the page input box is located at a front-end page of a mobile application;

an input processing module, for creating a native input box having the attribute information according to the attribute information, wherein the native input box is created at a native layer; and an information synchronizing module, for filling information, input by a user through the native input box, back to the page input box.

In the third aspect, the specification provides a non-transitory computer-readable storage medium for information input. The storage medium stores instructions executable by one or more processors to cause the one or more processors to perform operations. The operations comprise:

obtaining attribute information of a page input box, wherein the page input box is located at a front-end page of a mobile application;

creating a native input box having the attribute information according to the attribute information, wherein the native input box is created at a native layer; and filling information to the page input box, wherein the information is input through the native input box.

In the fourth aspect, the specification provides an information input system, which comprises: one or more processors and one or more non-transitory computer-readable memories coupled to the one or more processors. The processors are configured with instructions executable by the one or more processors to cause the system to perform operations. The operations comprise:

obtaining attribute information on a page input box, wherein the page input box is located at a page of a mobile application;

according to the attribute information, creating a native input box having the attribute information, wherein the native input box is created at a native layer; and filling information to the page input box, wherein the information is input through the native input box.

The information input method and apparatus set forth in the embodiments of the present specification, whereby information is inputted through a native input box created at a native layer, after which the input information is filled back to a front-end page. As the input box for input of information is created at a native layer, this manner avoids the focus confusion at a web page during input of information to the input box, thus ensuring that the information is input rapidly and effectively.

DETAILED DESCRIPTION

Mobile terminal apps typically include many application pages, one type of which are web pages displayed through webview control (may also be referred to as front-end pages); in web pages, some input boxes may sometimes be set based on service needs, such as an input box for input of a password, or an input box for input of a transfer amount. Such input box may be obtained through webkit rendering. However, this method for inputting information to an input box is prone to focus confusion, affecting input efficiency, and unable to input information rapidly and effectively. Based on this, the embodiments of the present specification provide an information input method to solve the foregoing problem.

Figure 1:
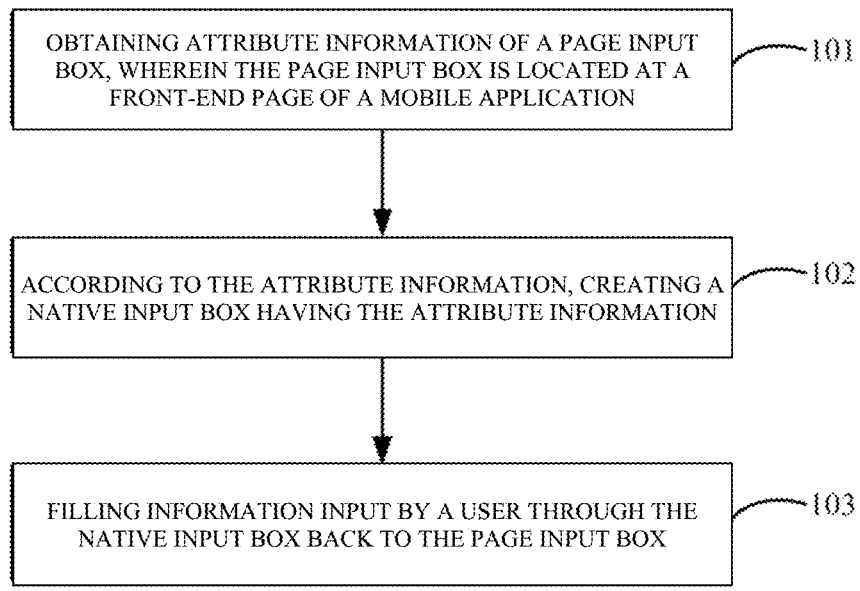
FIG. 1 is a flow chart of an information input method according to the embodiments of the present specification.

FIG. 1 shows a flow chart of an information input method according to the embodiments of the present invention, which may comprise:

In step 101, obtaining attribute information of a page input box, wherein the page input box is located at a page, for example, a front-end page, of a mobile application.

In this example, the input box located at the webview page may be referred to as a page input box, and the user may input information needed for processing service in the page input box. For example, the user may input a password needed during transfer in the password input box, or input a transfer amount needed during transfer in the amount input box.

The attribute information of an input box, for example, may include: display location of the input box at the front-end page, or the appearance parameters of the input box. The appearance parameters may include: width, height and color of the input box, defined box input fonts, etc. In this embodiment, the obtained attribute information of an input box may be all or part of the attributes of the page input box.

In step 102, according to the attribute information, creating a native input box having the attribute information.

In this step, a native input box may be created according to the attribute information obtained in step 101. The native input box has the attribute information. For example, the created native input box and the page input box at the front-end page have the same width and height, and the native input box and the page input box may have the same box type. In some embodiments, both may be password input boxes. The native input box is created at a native layer, which is a program created at the native layer based on a local operating system of a smart phone, such as iOS and Android, written and run with the native program language. For example, in iOS, objective-C is used to create the native input box.

In step 103, filling information input by a user through the native input box, back to the page input box.

In this step, a corresponding data filling-back event, such as keyup and keydown may be invoked, to fill in the information input in a native input box back to the page input box, so that input information is filled back to the front-end page, thus completing information input. Further, this example may have no limitation to the way to input information to a native input box. In another example, information may be input via a keyboard or voice.

In the information input method of this example, information is input through a native input box created at a native layer, and then filled back to a front-end page. As the input box for input of information is created at a native layer, this manner avoids focus confusion at the web page during input of information to the input box (e.g., the problem of the confusion may be caused by webkit defects or complex page logic at the web page), thus ensuring that the information is input rapidly and effectively.

Figure 2:
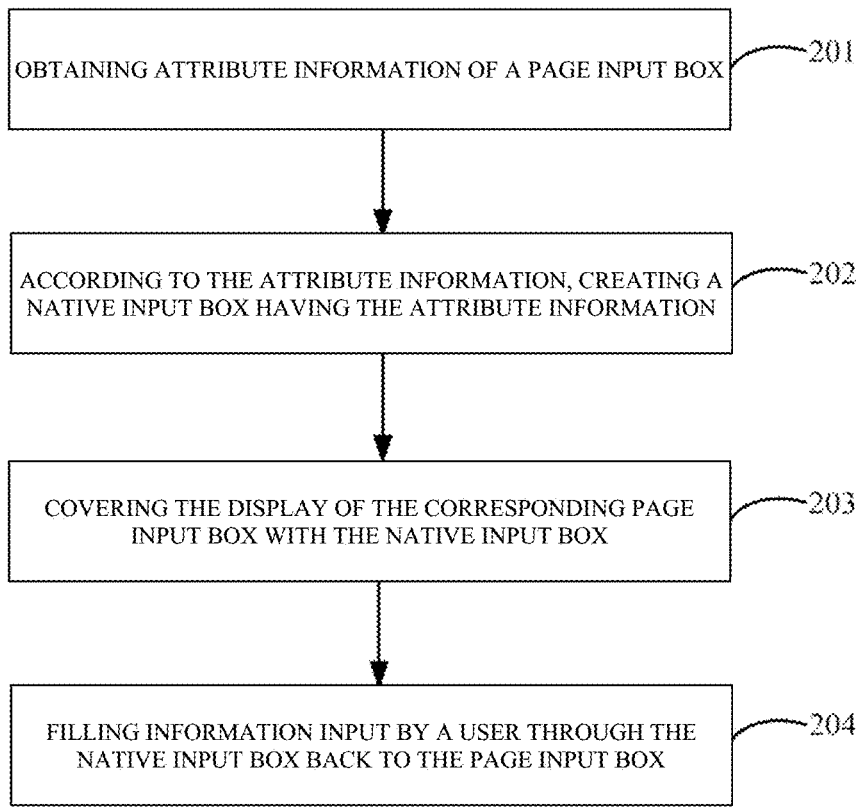
FIG. 2 is a flow chart of an alternative information input method according to the embodiments of the present specification.

In another example, in order that the user does not perceive a native input box and still feels like using the input box at the original front-end page to input information, thus improving user's usage experience, the embodiments of the present specification may ensure the consistency of the native input box and the page input box when creating a native input box. Refer to the flow of information input as shown in FIG. 2, which may comprise:

In step 201, obtaining attribute information of a page input box.

In some embodiments, the attribute information obtained in this step may include: display location of the page input box at the front-end page and appearance parameters. For example, the appearance parameters may include: width and height of the page input box, and font and font color of the page input box, etc.

In step 202, creating a native input box based on the attribute information and having the same attribute information.

In some embodiments, the created native input box and the page input box have the same width and height and may have the same font and font color as the input information.

In step 203, covering the input display of the corresponding page box with the native input box.

For example, the native input box may also be displayed at the display location of the page input box. In this way, the user will think information is input in a page input box and will not perceive a native input box.

In step 204, filling information input by the user through the native input box, back to the page input box.

Figure 3:
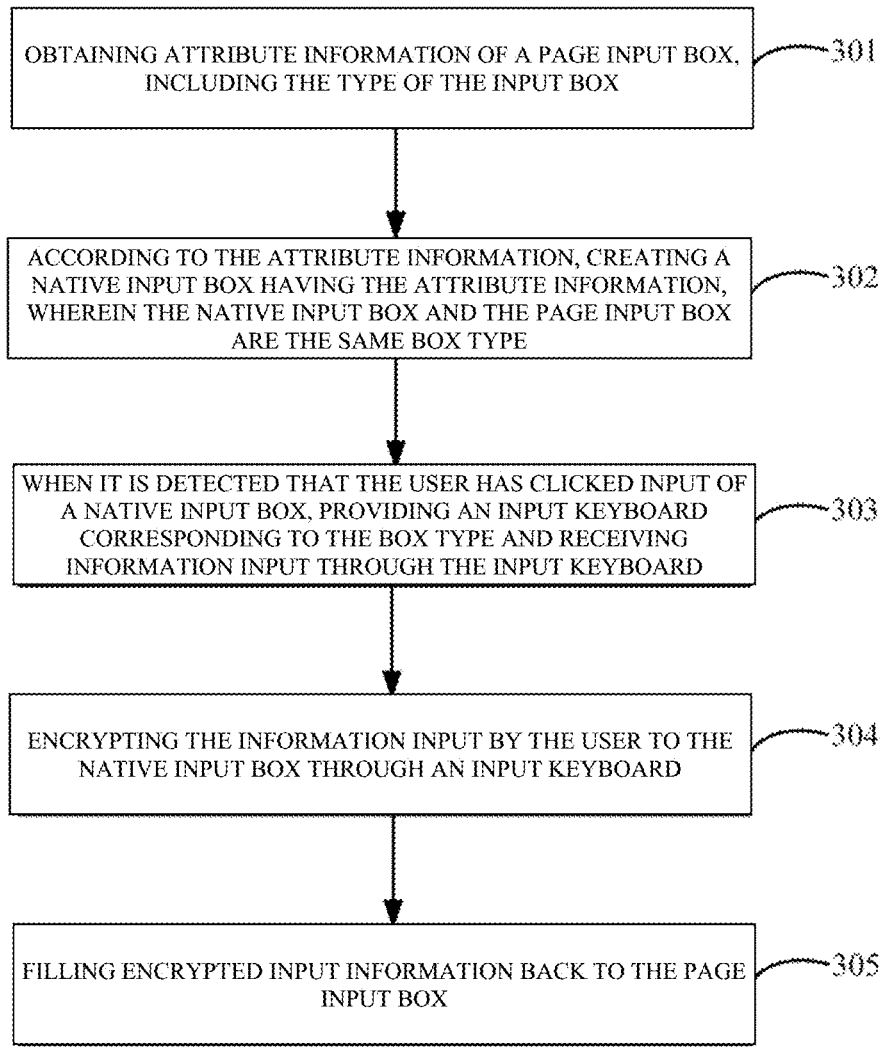
FIG. 3 is a flow chart of an alternative information input method according to the embodiments of the present specification.

For example, the native input box created at a native layer has an important feature, i.e., the native input box can be controlled. For example, the format of the information input in the native input box may be controlled, and the information input in the native input box can be encrypted. However, the input box rendered by webkit at a web page is not controllable. For instance, only the default system keyboard of the operating system can be used to input information, and the input process is not controllable. The embodiments of the present specification make the best use of the foregoing features of a native input box, may design the format of information input to ensure that information is input effectively, and may encrypt the input information to improve the security of information input. The embodiment shown in FIG. 3 below describes the information input method. Alternatively, either limitation to information input format or information encryption, may be applied in the native input box. The example of FIG. 3 describes an application of these two items at the same time.

In step 301, obtaining attribute information of a page input box, including the type of the input box.

Here, the box type is used to indicate the information type to be received by the page input box. For example, if the box type is an amount input box for input of a transfer amount, then the input information may allow figures only rather than a, b, c and other letters.

In step 302, according to the attribute information, creating a native input box having the attribute information, wherein the native input box and the page input box are in the same box type.

For example, if the page input box is an amount input box for input of a transfer amount, the correspondingly created native input box is an amount input box, too; if the page input box is a password input box for input of a transfer password, the correspondingly created native input box is also a password input box.

In step 303, when it is detected that the user has clicked to input into the native input box, providing an input keyboard corresponding to the box type, and receiving information input through the input keyboard.

In this embodiment, a few types of input keyboards corresponding to the box types may be defined. For example, if the box type is a password input box, a password input keyboard is provided accordingly, and the password input keyboard allows inputting a password only. If the box type is an amount input box, an amount input keyboard is provided accordingly, the amount input keyboard allows inputting an amount only, and a, b, c and other letters cannot be input. In this way, the format of the information input to the input box can be effectively limited to ensure that information is input effectively.

In step 304, encrypting the information input by the user to the native input box through an input keyboard.

For example, when the information type is a password, and the input keyboard is a password keyboard, the information input by the user through the input keyboard may be encrypted. Of course, for other types of keyboards, whether to encrypt input information or not may be set according to service requirements.

In step 305, filling encrypted input information back to the page input box.

Figure 4:
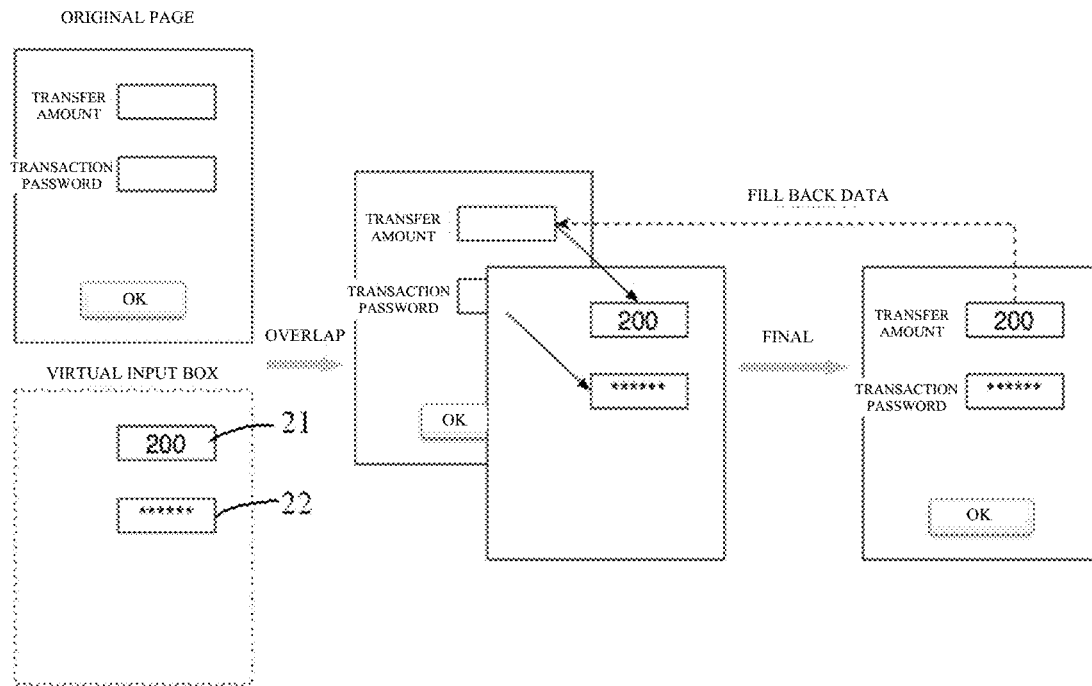
FIG. 4 is a schematic diagram of an information input process according to the embodiments of the present specification.
Figure 5:
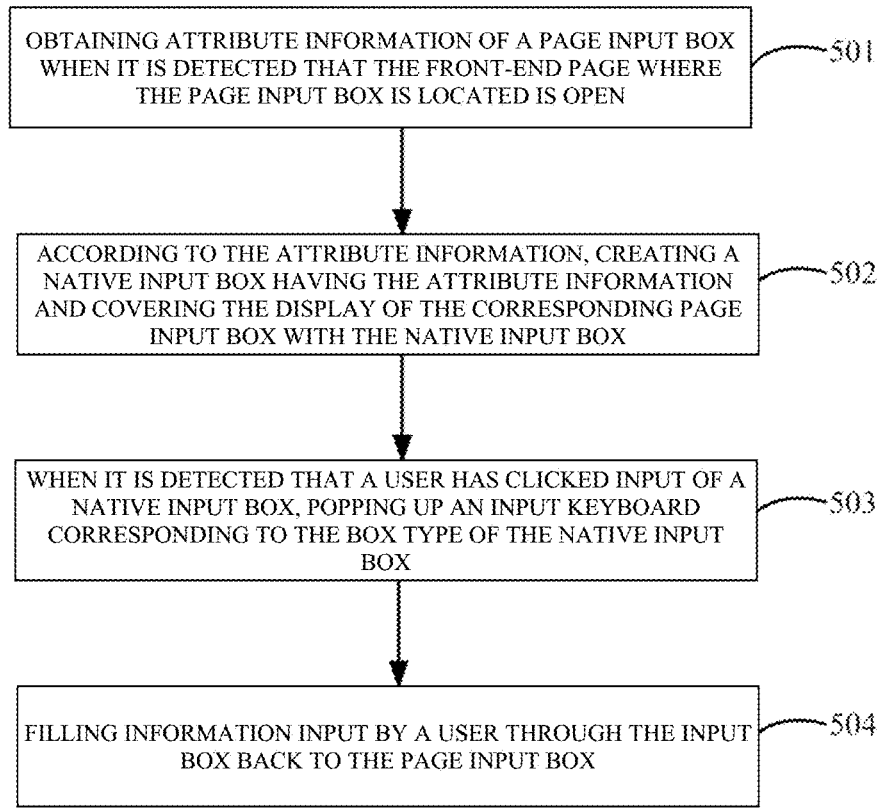
FIG. 5 is a flow chart of an alternative information input method according to the embodiments of the present specification.

Below an example using the method of the present specification to input information in an input box is described:

As shown in FIG. 4, at the front-end page (e.g., the page may be a webview page), there are two input boxes instructing the user to input "transfer amount" and "transaction password" (for example, the input boxes may be input boxes obtained through webkit rendering). These two input boxes may be called page input boxes. In the subsequent process, corresponding information, such as transfer amount and password, will be input in these two page input boxes using the method described in this embodiment. Referring to FIG. 5, which shows the flow of an information input method according to this embodiment, this method may be executed by an information input apparatus which may monitor operation of the application and execute this method, the method comprising:

In step 501, obtaining attribute information of a page input box when it is detected that the front-end page where the page input box is located is open.

For example, a user opens APP and clicks and enters an APP page, which may be a front-end page including amount, password and other page input boxes as shown in FIG. 4. When the information input apparatus according to this embodiment detects that the page is open, it may obtain attribute information of the page input box, which, for example, may include: display location of the input box, and width, height, color and other appearance parameters of the input box.

In this embodiment, attribute information of a page input box may also include: type of page input box. The box type is used to indicate the information type to be received by the page input box. Still taking FIG. 4 as an example, the box types of the two page input boxes include: amount type and password type. The amount type input box can receive input amount information such as "100" and "200" only and cannot receive non-amount information such as "*#" and "abc". The password type of input box can only receive information that can be used as a password. When collecting attribute information of a page input box, this embodiment not only obtains information about location, width and height but also obtains the foregoing box-type information.

In step 502, according to the attribute information, creating a native input box having the attribute information and covering the display of the corresponding page input box with the native input box.

As shown in FIG. 4, this embodiment creates native input boxes corresponding to page input boxes. For example, box 21 corresponds to the "transfer amount" native input box at the original APP page, and box 22 corresponds to the "transaction password" native input box at the original APP page. When being created, each of the native input boxes has the same box type as the corresponding page input box and may cover the display of the corresponding page input box. For example, as shown in FIG. 4, a native input box is overlapped on a page input box so that the user sees the native input box rather than the page input box and can see the native input box only when the user clicks input.

In step 503, when it is detected that a user has clicked a native input box, an input keyboard corresponding to the box type of the native input box pops up so that the user may input information.

In this example, when the information input apparatus detects that a user has clicked a native input box, suggesting that the user wants to input information at the moment, a keyboard will pop up. Here, the input keyboard is a keyboard corresponding to the box type of the native input box clicked by the user.

For example, supposing that the native input box is an input box corresponding to "transfer amount", an amount keyboard corresponding to box type "amount" may pop up; or when the native input box is an input box corresponding to "transaction password", a password keyboard corresponding to box type "password" may pop up; or, in other application scenarios, a numeric keyboard, character keyboard, etc. may also pop up. This example may define various types of keyboards, which pop up when corresponding types of native input boxes are clicked.

Providing an input keyboard corresponding to a box type for a user to input information may be used to limit input information to the information type allowed by the box, so that the user is not allowed to arbitrarily input any format of information other than the valid information limited by the input box, thus effectively controlling the validity of input data.

In step 504, filling information input by a user through the native input box back to the page input box.

For example, when information "synchronously" input in the native input box is filled back to a page input box, playback of the corresponding events maybe simulated, such as keydown and keyup, so that information is filled back to the page input box. Here, when the information type is a password and the input keyboard is a password keyboard, the information obtained by the user through a keyboard (e.g., if the user types in abc123 through a keyboard as a password, abc123 is the information obtained through a keyboard) may be encrypted before being filled back to the page input box to ensure the security of password input.

In the information input method of the embodiments of the specification, native input boxes and input keyboards developed at the native end are adopted to input information to page input boxes at the front-end page so that the input of information through native input boxes and input keyboards will not affect the APP page, thus avoiding focus confusion and other problems and ensuring that information is input effectively. Furthermore, native input boxes and input keyboards developed at the native layer are highly controllable, for example, native input boxes are controls developed at the native end and may control encryption of information in the native input boxes to further enhance the security of information input.

Figure 6:
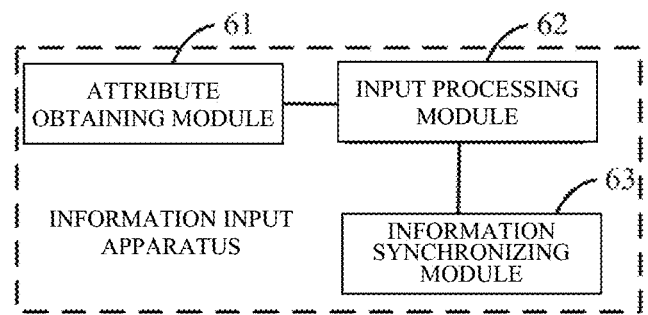
FIG. 6 is a schematic diagram of the structure of an information input apparatus according to the embodiments of the present specification.

FIG. 6 shows an information input apparatus, which may execute the method in the embodiments of the present application. As shown in FIG. 6, the apparatus may comprise: an attribute obtaining module 61, an input processing module 62 and an information synchronizing module 63.

The attribute obtaining module 61 is configured to obtain attribute information of a page input box, wherein the page input box is located at a front-end page of a mobile application.

The input processing module 62 is configured to create a native input box having the attribute information according to the attribute information, wherein the native input box is created at a native layer.

The information synchronizing module 63 is configured to fill information input by a user through the native input box back to the page input box.

In one embodiment, the attribute obtaining module 61 is configured to obtain attribute information of a page input box when the front-end page where the page input box is located is detected to be open.

In another embodiment, the input processing module 62 is configured to create the native input box according to the display location and appearance parameters of the page input box and covering the display of the corresponding page input box with the native input box.

In one example, the attribute information includes: type of the page input box, the native input box corresponding to the page input box with the same box type. The input processing module 62 is also configured to provide an input keyboard corresponding to the box type according to the type of the native input box. The input keyboard allows inputting information of the information type.

In another example, the information synchronizing module 63 is also configured to: fill the information input by a user through the input keyboard back to the page input box after encryption when the type of the information is password and the input keyboard is a password keyboard.

In one aspect, embodiments of the present application may be in the form of software function units and sold or used as stand-alone products and may be stored in computer-readable storage medium. Based on this understanding, the technical solution in the present application or the part making contribution to current technologies or part of the technical solution may in essence be reflected in the form of a software product. The computer software product is stored in a storage medium and includes a number of instructions for enabling a device to proceed to all or some of the steps of the method in the embodiments of the present invention. The foregoing storage media include all kinds of media that may store program codes, such as USB disk, mobile hard disk, ROM (Read-Only Memory), RAM (Random Access Memory), diskettes and compact discs.

The foregoing descriptions are preferred embodiments of the present invention and are not intended to limit the present invention. All modifications, identical replacements and improvements made without departing from the spirit and principle of the present invention shall fall within the scope of the present invention.

What is claimed is:

1. An information input method, comprising:
obtaining a plurality of attributes of a page input box, wherein the page input box is located at a page of a mobile application on a mobile terminal, wherein the obtained plurality of attributes comprise an information type of inputs allowed in the page input box;
creating a native input box having the obtained plurality of attributes, wherein the native input box is created at a native layer of an operating system and in a native programming language of the operating system, wherein the obtained plurality of attributes further comprise a box type of the page input box, and the native input box corresponding to the page input box has the same box type;
covering the page input box with the native input box so that a user sees the native input box rather than the page input box;
popping up a native input keyboard for information input when the native input box is clicked;
providing the native input keyboard corresponding to the box type of the native input box, wherein the native input keyboard allows inputting, into the native input box, only information of the information type of inputs allowed in the page input box;
determining whether inputs in the native input box are to be encrypted based on the information type of inputs allowed in the page input box;
in response to determining that inputs in the native input box are to be encrypted, encrypting information input through the native input box; and
filling the encrypted information to the page input box.

2. The method of claim 1, wherein the obtaining the plurality of attributes of the page input box comprises:
obtaining the plurality of attributes of the page input box when the page of the mobile application is open.

3. The method of claim 1, wherein the creating the native input box having the obtained plurality of attributes comprises:
creating the native input box according to display location and appearance parameters of the page input box.

4. The method of claim 1, wherein the obtained plurality of attributes further comprise width and height of the page input box.

5. The method of claim 1, wherein the obtained plurality of attributes further comprise font and font color of the page input box.

6. The method of claim 1, wherein the native input box is configured to control a format of information input in the native input box.

7. The method of claim 1, wherein the obtained plurality of attributes further comprise:
a display location of the page input box; a width, a height, and a color of the page input box; a type of characters for inputs allowed in the page input; and a font and a font color for inputs allowed in the page input box.

8. The method of claim 1, wherein:
the determining whether the inputs in the native input box are to be encrypted comprises:
determining that the information type of inputs allowed in the page input box is passwords, and
determining that the inputs are to be encrypted;
the encrypting information input through the native input box comprises:
obtaining a password input via the native keyboard through the native input box,
and encrypting the password; and
the filling the encrypted information to the page input box comprises filling the encrypted password to the page input box.

9. A non-transitory computer-readable storage medium for information input, storing instructions executable by one or more processors to cause the one or more processors to perform operations comprising:

obtaining a plurality of attributes of a page input box, wherein the page input box is located at a page of a mobile application on a mobile terminal, wherein the obtained plurality of attributes comprise an information type of inputs allowed in the page input box;

creating a native input box having the obtained plurality of attributes, wherein the native input box is created at a native layer of an operating system and in a native programming language of the operating system, wherein the obtained plurality of attributes further comprise a box type of the page input box, and the native input box corresponding to the page input box has the same box type;

covering the page input box with the native input box so that a user sees the native input box rather than the page input box;

popping up a native input keyboard for information input when the native input box is clicked;

providing the native input keyboard corresponding to the box type of the native input box, wherein the native input keyboard allows inputting, into the native input box, only information of the information type of inputs allowed in the page input box;

determining whether inputs in the native input box are to be encrypted based on the information type of inputs allowed in the page input box;

in response to determining that inputs in the native input box are to be encrypted, encrypting information input through the native input box; and filling the encrypted information to the page input box.

10. The non-transitory computer-readable storage medium of claim 9, wherein the operations further comprise:
obtaining the plurality of attributes of the page input box when the page of the mobile application is open.

11. The non-transitory computer-readable storage medium of claim 9, wherein the operations further comprise:
creating the native input box according to display location and appearance parameters of the page input box.

12. The non-transitory computer-readable storage medium of claim 9, wherein the obtained plurality of attributes further comprise width and height of the page input box, and font and font color of the page input box.

13. The non-transitory computer-readable storage medium of claim 9, wherein the native input box is configured to control a format of information input in the native input box.

14. An information input system, comprising one or more processors and one or more non-transitory computer-readable memories coupled to the one or more processors and configured with instructions executable by the one or more processors to cause the system to perform operations comprising:

obtaining a plurality of attributes of a page input box, wherein the page input box is located at a page of a mobile application on a mobile terminal, wherein the obtained plurality of attributes comprise an information type of inputs allowed in the page input box;

creating a native input box having the obtained plurality of attributes, wherein the native input box is created at a native layer of an operating system and in a native programming language of the operating system, wherein the obtained plurality of attributes further comprise a box type of the page input box, and the native input box corresponding to the page input box has the same box type;

covering the page input box with the native input box so that a user sees the native input box rather than the page input box;

popping up a native input keyboard for information input when the native input box is clicked;

providing the native input keyboard corresponding to the box type of the native input box, wherein the native input keyboard allows inputting, into the native input box, only information of the information type of inputs allowed in the page input box;

determining whether inputs in the native input box are to be encrypted based on the information type of inputs allowed in the page input box;

in response to determining that inputs in the native input box are to be encrypted, encrypting information input through the native input box; and filling the encrypted information to the page input box.

* * * * *